United States Patent [19]

Suzuki et al.

[11] Patent Number: 4,792,497
[45] Date of Patent: Dec. 20, 1988

[54] MAGNETIC RECORDING MEDIA FOR LONGITUDINAL RECORDING

[75] Inventors: Hiroyuki Suzuki, Kawasaki; Yoshihiro Shiroishi, Hachioji; Sadao Hishiyama, Sayami; Tomoyuki Ohno, Kokubunji; Kazuetsu Yoshida, Kodaira; Shyuichi Kojima, Odawara; Susumu Funamoto, Odawara; Yasushi Kitazaki, Odawara; Sakae Ohta, Odawara; Hajime Aoi, Tachikawa, all of Japan

[73] Assignee: Hitachi, Ltd., Tokyo, Japan

[21] Appl. No.: 149,480

[22] Filed: Jan. 28, 1988

[30] Foreign Application Priority Data

Jan. 29, 1987 [JP] Japan .................................. 62-17171

[51] Int. Cl.⁴ ............................................ H01F 10/00
[52] U.S. Cl. .................................... 428/336; 427/131; 427/132; 428/611; 428/663; 428/665; 428/667; 428/678; 428/694; 428/900; 428/928
[58] Field of Search ............... 428/694, 336, 900, 611, 428/667, 678, 928, 663, 665; 427/131, 132

[56] References Cited

U.S. PATENT DOCUMENTS 4,552,820 11/1985 Lin et al. ............................... 428/611
4,567,116 1/1986 Sawada et al. ....................... 428/900
4,713,279 12/1987 Fujiwara et al. .................... 428/900

Primary Examiner—Paul J. Thibodeau
Attorney, Agent, or Firm—Antonelli, Terry & Wands

[57] ABSTRACT

Disclosed is a magnetic recording medium of the magnetic metal thin-film type for longitudinal recording, in which the noise is reduced by selecting the value of maximum torque L (the product of magnetic anisotropy energy Ku and magnetic layer volume v; as measured by setting the axis of rotation in plane of the medium) and the value of magnetic flux $\phi$ (the product of saturation magnetization Ms and magnetic layer volume v) from a range defined by $0 < L/(2\pi \cdot \phi^2) < 4 \times 10^5$ (erg/emu²).

8 Claims, 4 Drawing Sheets

MAGNETIC RECORDING MEDIA FOR LONGITUDINAL RECORDING

BACKGROUND OF THE INVENTION

This invention relates to magnetic recording media for longitudinal recording and the like. More particularly, it relates to a magnetic recording medium for longitudinal recording, which is good in corrosion resistance, low in noise, excellent in read-and-write characteristics, suitable for high-density recording, and high in reliability.

Conventionally, as the magnetic recording medium for high-density recording, there has been proposed a medium employing a magnetic metal film as described in Japanese Patent Publication No. 54-33523.

In general, for the formation of a magnetic metal film constituting the magnetic layer of the magnetic recording medium, there are used techniques of vacuum deposition, sputtering, electrolytic plating, and ion beam sputtering. With the recent increasing demand for a higher recording density and a higher reliability, it has been proposed to add a third element to a magnetic metal particularly to increase the corrosion resistance, as disclosed in Japanese Patent Application "Kokai" (Laid-open) No. 57-15406.

However, almost all of these proposed prior arts relate to magnetic recording tapes and have not yet satisfied strict requirements for the read-and-write characteristics and the reliability as requirdd for computer hard disks, etc.

The magnetic recording media employing a thin magnetic metal film are generally accompanied with a high noise and so the reduction in noise is required. Moreover, as described in Hewlett-Packard Journal, 36, No. 11 (1985), 30, it is said that the magnetic as well as read-and-write characteristics become deteriorated even more when a third element is added to improve the reliability in corrosion resistance or the like.

SUMMARY OF THE INVENTION

An object of the present invention is to provide a magnetic recording medium for longitudinal recording, which is a thin magnetic film of a single species of metal such as Co, Ni or Fe or of a metal containing Co, Ni or Fe as major constituent and which is low in noise and good in read-and-write characteristics, while an improved corrosion resistance of the thin magnetic metal film being substantially retained.

In order to solve the aforementioned problems in prior art, the present inventors experimentally prepared magnetic recording media having various magnetic characteristics, crystallinities and orientation tendencies by using various magnetic materials and varying the film deposition-conditions; then the read-and-write characteristics of the resultant recording media were examined in detail.

As a result, it has become possible to obtain a magnetic recording medium of low noise by selecting the value of maximum torque L (the product of magnetic anisotropy energy Ku and the volume v of magnetic layer), as measured by setting the axis of rotation in plane of the medium, and the value of magnetic flux $\phi$ (the product of saturation magnetization Ms and the volume v of magnetic layer) so as to meet the formula $0 < L/(2\pi \cdot \phi^2) < 4 \times 10^5$ (erg/emu$^2$). That is, the object of this invention is achieved by decreasing the anisotropy energy Ku ($Ku = 2\pi \cdot Ms^2 - K_\perp$, where $K_\perp$ denotes the perpendicular magnetic anisotropy constant) of the medium, said increase being made possible by increasing the perpendicular anisotropic component by the adjustment of process conditions under which the magnetic layer and the orientation control film are formed. For instance, in forming a magnetic layer of a Co-Ni or Co-Cr alloy on a Cr under layer by RF sputtering, the crystal grains become finer and the perpendicular orientation becomes higher by conducting the sputtering under a high Ar pressure and a low power density. Also, in the film deposition by DC sputtering or ion beam sputtering Ku can be decreased by decreasing the crystal grain size and increasing the perpendicular orientation component, though the range of suitable film-deposition conditions may be different.

Thus, the present inventors found that the extent of zigzag domain can be reduced by decreasing the crystal grain size of the recording medium and controlling the orientation and crystallinity to increase the perpendicular magnetic anisotropy constant $K_{195}$ so far as the reproduced waveform of the original record is obtained and to reduce the magnetic anisotropy energy Ku below $5 \times 10^6$ erg/cm$^3$. This is because the dmmagnetization field in the plane can be reduced by increasing the crystallinity and orientation in the magnetic layer, increasing the interaction between crystal grains by the reduction of crystal grains size in the magnetic layer and, in addition, imparting perpendicular anisotropy. Generally, the noise in a magnetic recording medium of the thin metal film type is in interrelationship to the extent of zigzag domain in the transition region between the recorded bits. The reduction in the extent of zigzag domain permits a decrease in fluctuation of magnetization and a reduction in the interaction between bits, resulting in a marked reduction in noise to produce high-density recording characteristics.

However, if Ku becomes too small, the magnetization records arrange themselves in a completely perpendicular direction to the medium and when reproduced with a ring head, the reproduced waveform becomes deformed, making the medium undesirable for longitudinal magnetic recording.

It is known that when $K_\perp > 2\pi Ms^2$, there is generally obtained a perpendicular magnetization film which produces magnetic orientation in a direction perpendicular to the medium surface. Even when $K_\perp < 2\pi \cdot Ms^2$, if $Ku \leq 1 \times 10^6$ erg/cm$^3$, the record magnetization has a perpendicular component and, different from the case of an in-plane medium, the waveform reproduced with a ring head becomes a di-pulse type characteristic of a perpendicular magnetic recording. Such a magnetic medium is undesirable for the longitudinal magnetic recording. For this reason, the value of Ku should meet the formula $1 \times 10^6$ erg/cm$^3 < Ku \leq 5 \times 10^6$ erg/cm$^3$, preferably $1 \times 10^6$ erg/cm$^3 < Ku \leq 3 \times 10^6$ erg/cm$^3$. In fact, a magnetic recording medium of low noise and excellent corrosion resistance is obtained by adding a total of 0.5 to 10 at (atomic) % of Zr and Ti to a Co-(18 to 50) at % Ni alloy, or a total of 0.1 to 10 at % of Hf and Zr to a Co-(18 to 50) at % Ni alloy, or a total of 6 to 20 wt % of Ti and Zr to a Co-(5 to 17) at % Cr alloy, and providing, for example a Cr underlayer, 100 to 500 nm in thickness, between the magnetic layer and a non-magnetic substrate. Further, a magnetic recording medium having a more improved corrosion resistance and, in addition, an excellent wear resistance is obtained by providing a nonmagnetic protective film of 10 to 80 nm in thickness on the magnetic layer.

As for the magnetic metal thin-film constituting the magnetic layer of the present magnetic recording medium, that of a single species of metal element of Co, Ni or Fe or that of an alloy containing Ni or Fe as major constituent is desirable. Of these magnetic thin films, a preferable one is that composed of a Co-Ni or Co-Cr alloy.

An effective result of the present invention is recognizable in a magnetic recording disk for longitudinal recording, which employs a magnetic metal thin-film made of a Co-Ni, Co-Cr, Co-Re, Co-Pt, Co-Ni-Cr, Co-Ni-Ta, or Fe-Co-Ni alloy. These materials, however, present some problem in corrosion resistance. As contrasted, the corrosion resistance is improved by adding Zr and Ti or Hf as a third and fourth element to the magnetic layer and providing on the magnetic layer a dense passivation film. In this case, an improvement in corrosion resistance is recognizable when the sum of Ti and Zr or the sum of Zr and Hf is 0.1 at % or more based on total amount of Co and Ni. If the said sum exceeds 10 at %, the reproduction output is decreased so much that the addition becomes undesirable. It is desirable for the further improvement in reproduction output to adjust the concentration of Ni to a range of from 18 to 50 at % based on Co. As to the Co-Cr alloys, an improvement effect on the corrosion resistance is observed by adjusting the sum of Ti and Zr to 6 wt % or above, whereas a marked deterioration in reproduction output is observed if the sum exceeds 20 wt %. In this case, desirable characteristics are not obtained unless the oxygen content and the carbon (C) content of the target are 100 ppm or less and 50 ppm or less, respectively. In view of the reproduction output, it is desirable that the concentration of Cr be in a range of from 5 to 17 at % based on Co.

The underlayer provided between the magnetic layer and the nonmagnetic substrate is preferably made of a single species of metal such as Cr, Mo or W or an alloy containing Cr, Mo or W as major constituent for the purpose of steady enhancement of an in-plane coercive force.

The nonmagnetic protective layer of 10 to 80 nm in thickness provided on the magnetic layer according to this invention is a carbon (C) coating layer or a layer composed of carbide (e.g. SiC), nitride (e.g. BN), or oxide (e.g. $SiO_2$). The provision of such a protective layer is also favorable to the marked improvement of wear resistance.

DETAILED DESCRIPTION OF THE PREFERRED EMBODIMENTS

Example 1

Figure 1:
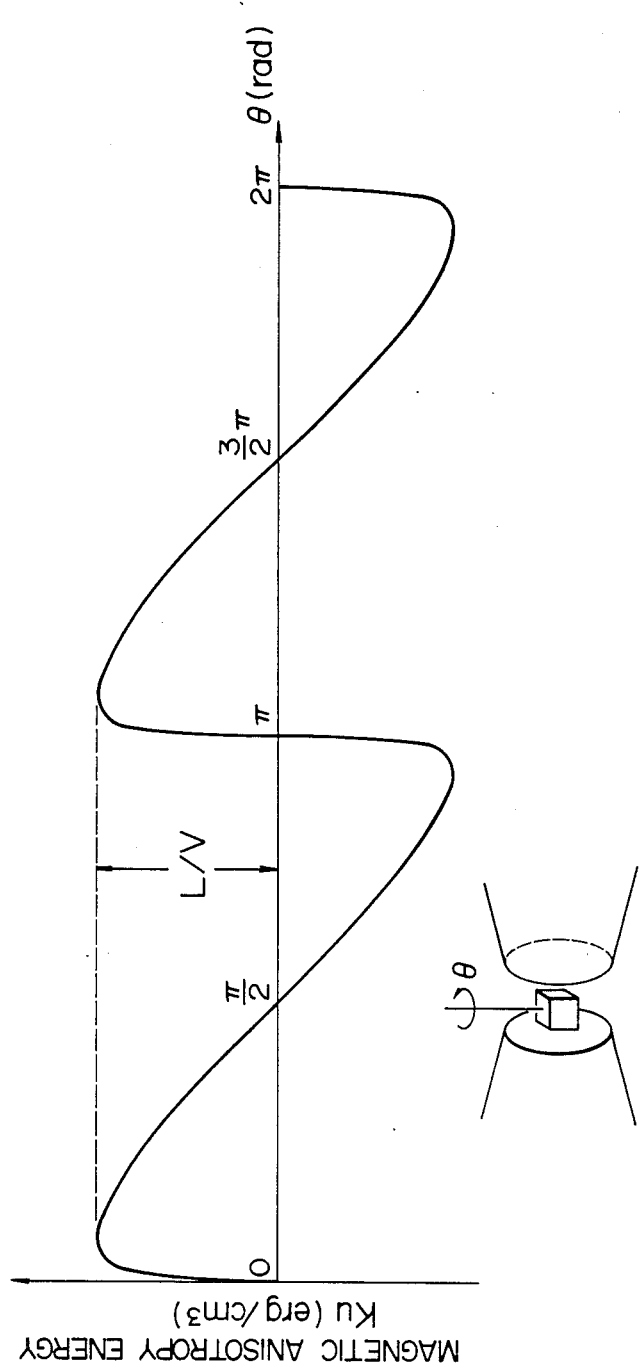
FIG. 1 is a graph representing an example of measured torque curve of the present magnetic recording medium in Example 1.

Sputtered metal disks having varied magnetic characteristics were experimentally prepared from Co-Ni or Co-Cr alloys by DC magnetron sputtering using Ar gas, in which the nitrogen partial pressure was kept below 1 ppm, under varied conditions: a sputtering pressure of from 0.5 to 50 m Torr., a power density of from 0.7 to 30 W/cm$^2$, a substrate temperature of from room temperature to 250° C., and a Cr underlayer thickness of from 50 to 700 nm. The resulting disks were written and read with a Mn-Zn ferrite ring head and the noise $N_D$ of each disk medium was measured. The oxygen content and carbon content of the target for magnetic layer were 40 and 30 ppm, respectively. The thickness of magnetic layer was 60 nm. A small test specimen of 7 mm square was cut out of each disk and one side of the specimen was ground by filing. The maximum torque L (the product of magnetic anisotropy energy $K_u$ and the volume v of magnetic layer), as measured by setting the axis of rotation in plane, was obtained by applying a magnetic field of 10 kOe by means of a torque meter. The specimen was tested also for the magnetic flux $\phi$ (the product of saturation magnetization Ms and the volume v of magnetic layer) by means of a vibrating sample magnetometer (VSM). The measured values of maximum torque L (erg), magnetic flux $\phi$ (emu), and noise $N_D$ ($\mu$ Vrms) were as shown in Table 1. An example of measured torque curve was as shown in FIG. 1. The values of $L/2\pi\phi^2$ (erg/emu$^2$) and $N_D^2/\phi$ [(Vrms)$^2$/emu], which were normalized $L/\phi$ and $N_D^2$ with $\phi$, were calculated from the values of L, $\phi$ and $N_D$ of Table 1 and were as shown also in Table 1.

TABLE 1

| Sample No. | L [erg] | $\phi$ [emu] | $N_D$ [$\mu$Vrms] | $L/2\pi\phi^2$ [erg/emu$^2$] | $N_D^2/\phi$ [($\mu$Vrms)$^2$/emu] |
|---|---|---|---|---|---|
| 1 | 18.2 | 2.38 × 10$^{-3}$ | 20.4 | 5.1 × 10$^5$ | 175 × 10$^3$ |
| 2 | 15.7 | 2.28 × 10$^{-3}$ | 19.7 | 4.8 × 10$^5$ | 170 × 10$^3$ |
| 3 | 18.4 | 2.42 × 10$^{-3}$ | 19.4 | 5.0 × 10$^5$ | 156 × 10$^3$ |
| 4 | 16.0 | 2.43 × 10$^{-3}$ | 19.1 | 4.3 × 10$^5$ | 150 × 10$^3$ |
| 5 | 13.4 | 2.13 × 10$^{-3}$ | 16.7 | 4.7 × 10$^5$ | 131 × 10$^3$ |
| 6 | 17.6 | 2.18 × 10$^{-3}$ | 18.0 | 3.9 × 10$^5$ | 121 × 10$^3$ |
| 7 | 25.0 | 3.01 × 10$^{-3}$ | 16.0 | 4.4 × 10$^5$ | 85 × 10$^3$ |
| 8 | 25.1 | 3.12 × 10$^{-3}$ | 15.8 | 4.1 × 10$^5$ | 80 × 10$^3$ |
| 9 | 11.4 | 2.25 × 10$^{-3}$ | 12.9 | 3.6 × 10$^5$ | 74 × 10$^3$ |
| 10 | 22.9 | 2.98 × 10$^{-3}$ | 12.8 | 4.1 × 10$^5$ | 55 × 10$^3$ |
| 11 | 24.9 | 3.19 × 10$^{-3}$ | 11.3 | 3.9 × 10$^5$ | 40 × 10$^3$ |
| 12 | 21.9 | 3.20 × 10$^{-3}$ | 12.0 | 3.4 × 10$^5$ | 45 × 10$^3$ |
| 13 | 15.5 | 2.87 × 10$^{-3}$ | 12.1 | 3.0 × 10$^5$ | 51 × 10$^3$ |
| 14 | 15.1 | 2.79 × 10$^{-3}$ | 9.0 | 3.1 × 10$^5$ | 29 × 10$^3$ |
| 15 | 12.6 | 3.02 × 10$^{-3}$ | 10.0 | 2.2 × 10$^5$ | 33 × 10$^3$ |
| 16 | 11.8 | 3.06 × 10$^{-3}$ | 8.2 | 2.0 × 10$^5$ | 22 × 10$^3$ |
| 17 | 9.6 | 2.63 × 10$^{-3}$ | 6.7 | 2.2 × 10$^5$ | 17 × 10$^3$ |

Figure 4:
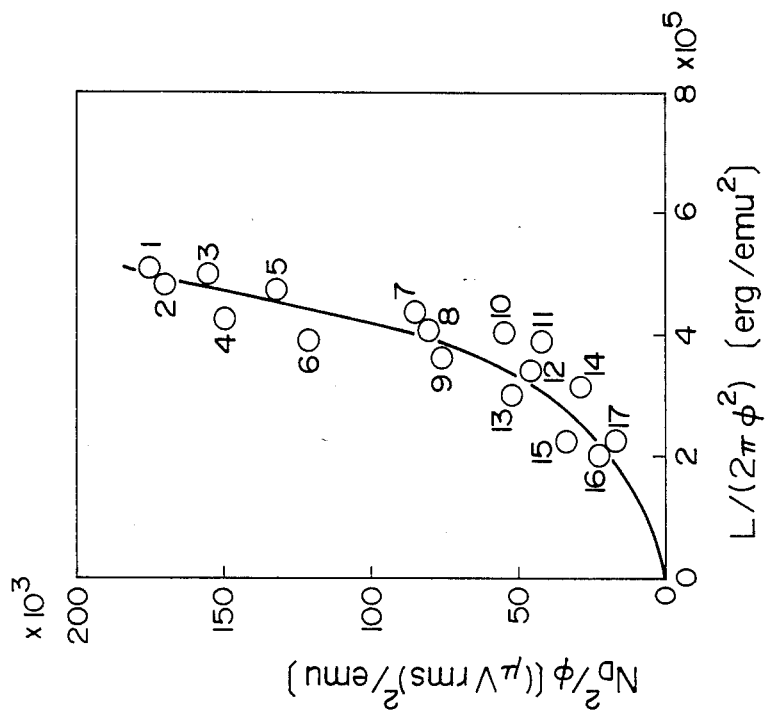
FIG. 4 is a graph representing the relationship between $N_D^2/\phi$ and $L/(2\pi \cdot \phi^2)$ of the medium in Example 1.

The relationship between $L/2\pi\phi^2$ and $N_D^2/\phi$ was as shown in FIG. 4. It is seen that the noise becomes small when $0 < L/2\pi\phi^2 < 4 \times 10^5$ (erg/emu$^2$) is satisfied. In the present Example, a medium which meets the above conditions was obtained when Ar gas pressure was 10 m Torr. or above and the power density was 10 W/cm$^2$ or below. This medium was examined by Auger spectroscopy and gas analysis. It was found that no nitrogen nor carbon exceeding the limit of detection sensitivity was found; occlusion of Ar gas within the thin-film was very little; the medium was consisted of fine crystal grains of crystallographically excellent quality; and the structure of magnetic layer was favorable to a high orientation.

Figure 2:
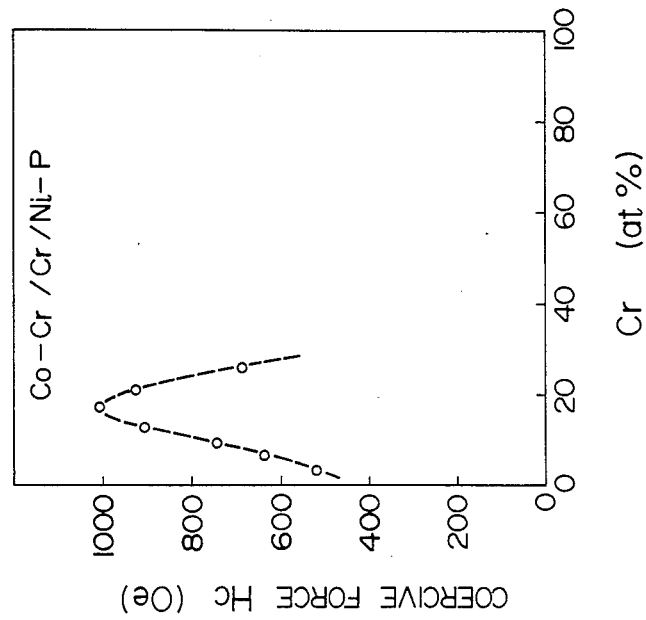
FIG. 2 is a graph representing the relationship between the in-plane coercive force and the Cr content of the Co-Cr/Cr/Ni-P medium in Example 1.
Figure 3:
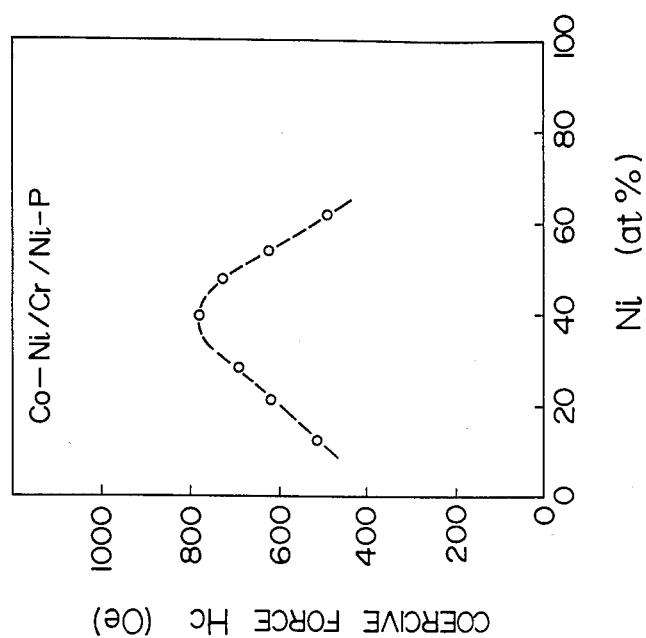
FIG. 3 is a graph representing the relationship between the in-plane coercive force and the Ni content of Co-Ni/Cr/Ni-P medium in Example 1.

FIGS. 2 and 3 show respectively the relationships between the in-plane coercive force $H_c$ and the Cr and Ni contents of Co-Cr/Cr/Ni-P and Co-Ni/Cr/Ni-P media. The measurement of in-plane coercive force $H_c$ was performed by use of a vibrating sample magnetometer (VSM).

As shown in FIGS. 2 and 3, it is apparent that the magnetic medium shows a coercive force of 600 Oe or more, which is suitable for longitudinal magnetic recording, when the Cr content of a Co-Cr alloy was 5 to 23 at % and the Ni content of a Co-Ni alloy was 18 to 50 at %; still higher coercive forces were obtained when Cr and Ni contents of respective alloys were 8 to 22 at % and 30 to 48 at %, respectively. In the case of Co-Cr alloys, the Cr content is preferably 17 at % or less, because too high a Cr content causes a reduction in magnetization and in output.

Example 2

A Ni-P plated Al-Mg alloy substrate disk of 130 mm $\phi$ was mirror-finished on the surface, then washed with water, and heated at 150° C. Onto the disk surface were successively deposited by DC magnetron sputtering a Cr underlayer of 250 nm in thickness, then a Co-30 at % Ni or Co-30 at % Ni-7.5 at % Ti or Co-30 at % Ni-5 at % Zr alloy layer of 60 nm in thickness, and finally a carbon protective layer of 40 nm in thickness. The sputtering conditions were varied in such a manner that the pressure of Ar containing 0.01% hydrogen was 5, 10, 12 or 15 m Torr., and the power density was 0.8, 1.6, 3.0, 6.4 or 16 W/cm². The oxygen and carbon contents of the target for magnetic layer were 80 and 40 ppm, respectively.

The disks thus obtained were tested, by means of a torque meter, for the magnetic anisotropy energy $K_u$ and for the read-and-write characteristics by using a ring head having a track width of 31 $\mu$m and at a flying height of 0.2 $\mu$m and a circumferential velocity of 20 m/sec.

Figure 5:
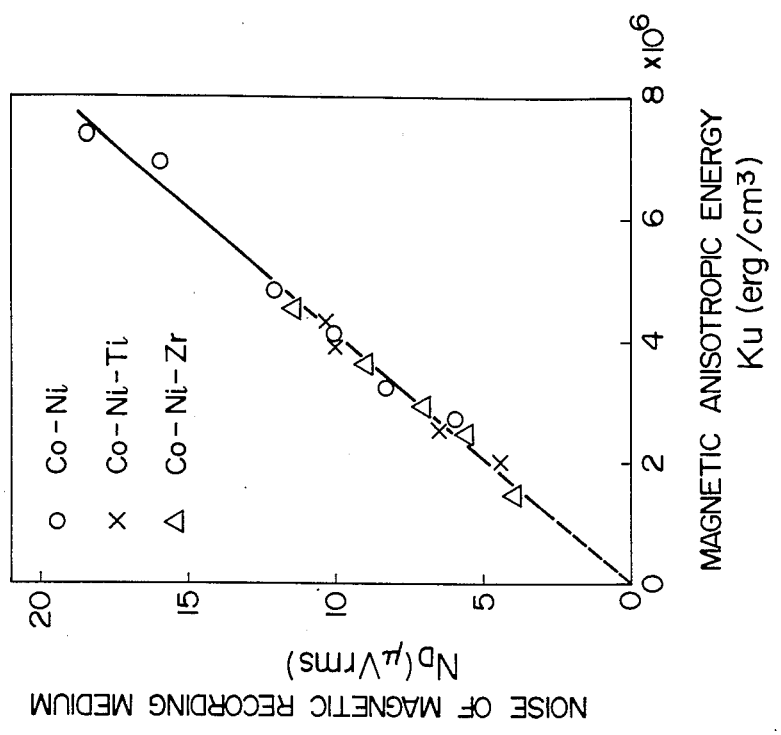
FIG. 5 is a graph representing the relationship between $N_D$ and $K_u$ of the medium in Example 2.

It became apparent that when the Ar pressure was 12 or 15 m Torr. and the power density was 0.8, 1.6 or 3.0 W/cm², the magnetic anisotropy energy $K_u$ became $5 \times 10^6$ erg/cm³ or below and the noise was diminished to 12 $\mu$Vrms or below, as shown in FIG. 5, thereby making it possible to record at a density as high as 20 kFCI or above.

When Ti and Zr were added to the Co-30 Ni alloy, the magnetic anisotropy energy $K_u$ and the noise $N_D$ became smaller as compared with the Co-30 Ni alloy layer formed under the same conditions. However, since the Co-Ni alloy has a higher output signal, the addition of Zr and Ti makes little difference from the viewpoint of signal-to-noise ratio, whereas the addition causes an improvement as large as 5 to 10-fold in corrosion resistance. Therefore, in view of reliability the addition of Ti and Zr is desirable. The desirable effect of the present invention was observed when the sum of Ti and Zr was 0.1 at % or more based on the sum of Co and Ni. However, if the sum of Ti and Zr became 10 at % or more, the output signal became markedly deteriorated.

From FIG. 5, it is seen that a magnetic recording medium having a $K_u$ value of $3 \times 10^6$ erg/cm³ or below shows a smaller noise of 7.5 $\mu$Vrms and permits a higher recording density of 25 kFCI or above. Because of such excellent performance characteristics, the above medium is preferred from a practical viewpoint. Such desirable effects are independent of the thickness of magnetic layer and are observed in the layers of 80, 40 and 20 nm in thickness.

To the contrary, in the case wherein a Co-18 at % Cr alloy layer was formed by RF sputtering on a glass substrate, $K_u$ becomes as small as $0.5 \times 10^6$ erg/cm³ and the reproduction waveform resembles that observed in the case of perpendicular magnetization, indicating that such a medium is undesirable for the longitudinal recording.

Example 3

On a Ni-P plated Al alloy substrate of 90 mm$\phi$, there were forme,, by RF conventional sputtering, a Cr, Mo or W underlayer of 500 nm in thickness, a Co-a at % Cr-b at % Zr layer of 60 nm in thickness and a c layer of 45 nm in thickness. The sputtering conditions were such that the substrate temperature was 180° C., the pressure of 99.999% pure Ar was 15 m Torr., and the power density was 2 V/cm². The oxygen content and the carbon content of the target for magnetic thin-film layer were 60 and 20 ppm, respectively, a was 5, 10 or 15 and b was 6, 10 or 20.

Every medium showed a small $K_u$ value of from $2 \times 10^6$ to $4 \times 10^6$ erg/cm³ and a small noise of from 5 to 10 $\mu$Vrms and permitted reading and writing at a high density of 20 kFCI or above, indicating excellent characteristics.

Example 4

Figure 6:
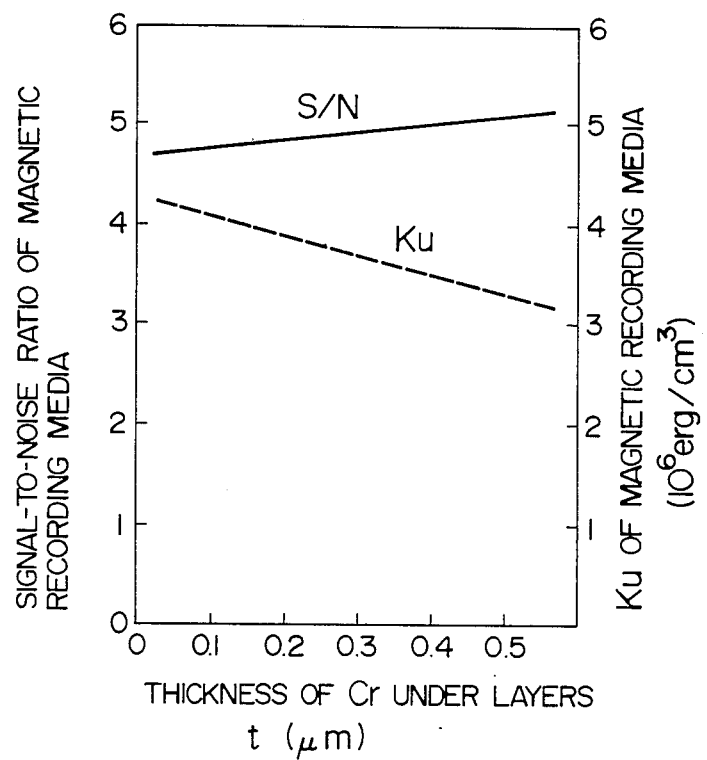
FIG. 6 is a graph representing the dependency of signal-to-noise (S/N) ratio and $K_u$ upon the thickness of Cr underlayer.

Various magnetic recording media were prepared under the same conditions as those in Example 2, except that the thickness of underlayer was 50, 100, 250, or 500 nm and the composition of magnetic layer was Co-45 at % Ni -5 at % Zr, Co-20 at % Ni-7 at % Zr, Co-45 at % Ni-5 at % Ti, Co-20 at % Ni-7 at % Ti, Co-30 at % Ni-3 at % Ti-3 at % Zr, Co-15 at % Cr-5 at % Zr, or Co-30 at % Ni-5 at % Zr-0.1 at % Hf. The S/N ratio (signal-to-noise ratio) of each medium was evaluated in the same manner as in Example 2. As a result, it was found that as shown in FIG. 6, when the thickness of the Cr underlayer became 100 nm (0.1 $\mu$m) or more, the noise was reduced and the S/N ratio became increased. However, too large a thickness of underlayer is undesirable, because if the thickness is increased to 500 nm (0.5 $\mu$m) or more, not only the surface irregularities of the medium are increased but also the large scale production of the medium becomes difficult.

Example 5

A Ni-P plated Al alloy substrate of 8.8 inch $\phi$ was provided, by DC magnetron sputtering, successively with a Cr, Mo or W underlayer of 300 nm in thickness, a Co-x at % Ni-y at % Zr-z at % Hf alloy layer of 45 nm in thickness, and a C layer of 35 nm in thickness under the conditions: substrate temperature of 100° C., pressure of Ar gas (nitrogen content<0.5 ppm) of 10 m Torr., and power density of 4 W/cm². The oxygen content and carbon content of the magnetic target were 70 ppm and 30 ppm, respectively; x was 20, 30, 40 or 50, y was 5, 7 or 9 and z was 0.1, 0.2, 1 or 2.

Every medium showed a $K_u$ value of from $1.5 \times 10^6$ to $5 \times 10^6$ erg/cm³ and a noise of from 4 to 12 $\mu$Vrms, indicating desirable record reproduction characteristics.

As described in detail above, according to the present invention there is obtained a magnetic recording medium for longitudinal recording, which is desirable in corrosion resistance, low in noise, excellent in read-and-write characteristics, suitable for high-density recording, and high in reliability.

What is claimed is:

1. A magnetic recording medium for longitudinal recording provided with a magnetic layer formed on a nonmagnetic substrate either directly or through an underlayer, which is characterized in that (A) said magnetic layer comprises a single metal species of Co, Ni or Fe or an alloy containing Co, Ni or Fe as major constituent and in that (B) the values of both (1) the maximum torque L represented by the product of a magnetic anisotropy energy Ku (as measured by setting the axis of rotation in the plane of the magnetic recording medium) and a magnetic layer volume v and (2) the magnetic flux $\phi$ represented by the product of a saturation magnetization Ms and a magnetic layer volume v are in the range defined by $0 < L/(2\pi \cdot \phi^2) < 4 \times 10^5$ (erg/emu$^2$).

2. A magnetic recording medium for longitudinal recording according to claim 1, wherein the value of the magnetic anisotropy energy Ku is in the range defined by $1 \times 10^6 < Ku \leq 5 \times 10^6$ (erg/cm$^3$).

3. A magnetic recording medium for longitudinal recording according to claim 1, wherein the value of the magnetic anisotropy energy Ku is in the range defined by $1 \times 10^6 < Ku \leq 3 \times 10^6$ (erg/cm$^3$).

4. A magnetic recording medium for longitudinal recording according to claim 1, wherein the magnetic layer is a Co-Ni alloy of 18 to 50 at % in Ni content based on Co and containing one or both of Zr and Ti in a total amount of 0.5 to 10 at % based on sum of Co and Ni.

5. A magnetic recording medium for longitudinal recording according to claim 1, wherein the magnetic layer is a Co-Ni alloy of 18 to 50 at % in Ni content based on Co and containing one or both of Hf and Zr in a total amount of 0.1 to 10 at % based on sum of Co and Ni.

6. A magnetic recording medium for longitudinal recording according to claim 1, wherein the magnetic layer is a Co-Cr alloy of 5 to 17 at % in Cr content based on Co and containing one or both of Zr and Ti in a total amount of 6 to 20 weight % based on sum of Co and Cr.

7. A magnetic recording medium for longitudinal recording according to claim 1, wherein the underlayer comprises a single metal species of Cr, Mo or W or an alloy containing Cr, Mo or W as major constituent and the thickness of the underlayer is in the range of from 100 to 500 nm.

8. A magnetic recording medium for longitudinal recording according to claim 1, wherein a protective layer is further provided and said protective layer is a carbon protective layer or consists of a single species of element of boron or silicon or at least one compound selected from carbides, nitrides, and oxides of boron and silicon and the thickness of the protective layer is in the range of from 10 to 80 nm.

* * * * *